(12) United States Patent
Abdulla et al.

(10) Patent No.: US 11,924,275 B2
(45) Date of Patent: Mar. 5, 2024

(54) TIERED ACCESS-ORIENTED BLOCKCHAIN ARCHITECTURE

(71) Applicants: Gentill Dawoud Abdulla, Dallas, TX (US); Michael Isaiah Jordan, Houston, TX (US)

(72) Inventors: Gentill Dawoud Abdulla, Dallas, TX (US); Michael Isaiah Jordan, Houston, TX (US)

(*) Notice: Subject to any disclaimer, the term of this patent is extended or adjusted under 35 U.S.C. 154(b) by 578 days.

(21) Appl. No.: 17/173,703

(22) Filed: Feb. 11, 2021

(65) Prior Publication Data

US 2021/0258372 A1 Aug. 19, 2021

Related U.S. Application Data

(60) Provisional application No. 62/975,948, filed on Feb. 13, 2020.

(51) Int. Cl.
*H04L 29/08* (2006.01)
*H04L 9/32* (2006.01)
*H04L 67/1061* (2022.01)
*H04L 67/1074* (2022.01)
*H04L 9/00* (2022.01)

(52) U.S. Cl.
CPC .......... *H04L 67/108* (2013.01); *H04L 9/3236* (2013.01); *H04L 67/1065* (2013.01); *H04L 67/1072* (2013.01); *H04L 67/1082* (2013.01); *H04L 9/50* (2022.05)

(58) Field of Classification Search
CPC ..... H04L 9/50; H04L 9/3236; H04L 67/1065; H04L 67/1082; H04L 67/1089
See application file for complete search history.

(56) References Cited

U.S. PATENT DOCUMENTS

2021/0406250 A1* 12/2021 Novo Diaz ............. G06F 16/27

* cited by examiner

*Primary Examiner* — Kostas J Katsikis
(74) *Attorney, Agent, or Firm* — Dickinson Wright PLLC

(57) ABSTRACT

In one embodiment, a method for maintaining a blockchain in a blockchain system is disclosed. The method may include determining whether a number of blocks included in the blockchain satisfies a threshold block condition. The blocks comprise an initial genesis block and one or more subsequent blocks. The method may also include, responsive to determining the number of blocks in the blockchain satisfies the threshold block threshold condition, determining whether a number of nodes participating in the blockchain system satisfies a threshold node condition. The method may also include, responsive to determining the number of nodes participating in the blockchain satisfies the threshold node condition, generating a subsequent genesis block by hashing the blockchain including the genesis block and the one or more subsequent blocks.

23 Claims, 10 Drawing Sheets

TIERED ACCESS-ORIENTED BLOCKCHAIN ARCHITECTURE

CROSS-REFERENCE TO RELATED APPLICATIONS

This application claims priority to and the benefit of U.S. Prov. Pat. App. 62/975,948, filed Feb. 13, 2020, and titled "Tiered Access-Oriented Blockchain Architecture". The content of this provisional application is incorporated herein by reference in its entirety.

TECHNICAL FIELD

This disclosure relates generally to blockchain technology. More specifically, this disclosure relates to a tiered access-oriented blockchain architecture.

BACKGROUND

A blockchain is a distributed database that maintains a continuously-growing list of records, called blocks, that may be linked together to form a chain. Each block in the blockchain may contain a timestamp and a link to a previous block and/or record. The blocks may be secured from tampering and revision. In addition, a blockchain may include a secure transaction ledger database shared by parties participating in an established, distributed network of computers. A blockchain may record a transaction (e.g., an exchange or transfer of information) that occurs in the network, thereby reducing or eliminating the need for trusted/centralized third parties. In some cases, the parties participating in a transaction may not know the identities of any other parties participating in the transaction but may securely exchange information. Further, the distributed ledger may correspond to a record of consensus with a cryptographic audit trail that is maintained and validated by a set of independent computers.

SUMMARY

In general, the present disclosure provides tiered access-oriented blockchain architecture.

In one embodiment, a method for maintaining a blockchain in a blockchain system is disclosed. The method may include determining whether a number of blocks included in the blockchain satisfies a threshold block condition. The blocks comprise an initial genesis block and one or more subsequent blocks. The method may also include, responsive to determining the number of blocks in the blockchain satisfies the threshold block threshold condition, determining whether a number of nodes participating in the blockchain system satisfies a threshold node condition. The method may also include, responsive to determining the number of nodes participating in the blockchain satisfies the threshold node condition, generating a subsequent genesis block by hashing the blockchain including the genesis block and the one or more subsequent blocks.

In one embodiment, a method may include receiving, at a first node, a block in a blockchain and determining whether the block is located at a certain position within the blockchain. The method may also include, responsive to determining the block is located at the certain position within the blockchain, receiving, for a threshold period of time, indications from other nodes participating in the blockchain system. The method may also include obtaining an average number of the other nodes from which the indications are received for the threshold period of time, and determining, based on the average number of the other nodes, a number of nodes to which the first node is connected.

In one embodiment, a method may include generating a string of blocks in a blockchain by ordering a set of blocks in the blockchain by block index, and generating ordered content in each of the plurality of blocks in the string of blocks by ordering content in each of the plurality of blocks by a block hash corresponding to each block of the plurality of blocks, and transaction data in each of the plurality of blocks. The method may also include, responsive to generating the ordered content in each of the plurality of blocks in the string of blocks, outputting an ordered blockchain including the string of blocks with the ordered content.

In another aspect, a system may include a memory device storing instructions and a processing device communicatively coupled to the memory device. The processing device may execute the instructions to perform one or more operations of any method disclosed herein.

In another aspect, a tangible, non-transitory computer-readable medium may store instructions and a processing device may execute the instructions to perform one or more operations of any method disclosed herein.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, independent of whether those elements are in physical contact with one another. The terms "transmit," "receive," and "communicate," as well as derivatives thereof, encompass both direct and indirect communication. The terms "transmit," "receive," and "communicate," as well as derivatives thereof, encompass both communication with remote systems and communication within a system, including reading and writing to different portions of a memory device. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable storage medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable storage medium" includes any type of medium capable of being accessed by a computer, such as read only memory (ROM), random access memory (RAM), a hard disk drive, a compact disc (CD), a digital video disc (DVD), solid state drive (SSD), or any other type of memory. A "non-transitory" computer readable storage medium excludes wired, wireless, optical, or other communication links that transport transitory electrical or other signals. A non-transitory computer readable storage medium includes media where data can be permanently stored and media where data can be stored and later overwritten, such as a rewritable optical disc or an erasable memory device.

The term "blockchain" may refer to a distributed database that maintains a continuously-growing list of records, called blocks, that may be linked together to form a chain.

The term "blockchain system" may refer to a group of nodes that cooperate to maintain and build a blockchain according to a protocol.

The term "node" may refer to a computing device participating in the blockchain system and that is connected to and interacts with the blockchain.

The term "hash" may refer to an output of a cryptographic function used in securing information in a blockchain.

The term "recorder node" may refer to a node participating in the blockchain system that performs functions pertaining to recording and redistributing the entirety of information within the blockchain.

The term "worker node" may refer to a node participating in the blockchain system that performs functions pertaining to collecting blocks by adding and verifying blocks onto a blockchain.

The term "rehash" may refer to performing a hash function on data that has previously been hashed.

The term "genesis block" may refer to a starting block of a blockchain.

The term "reward" may refer to an incentive, in digital token form used within a blockchain system where the digital token may be assigned a certain worth based on a type of function performed.

The term "data" may refer to information in digital form that may be transmitted and/or processed.

The term "transaction" may refer to any data that is processed through the blockchain.

The term "user" may refer to a person who uses a computing device.

The term "consensus algorithm" may refer to a process used to achieve approval or agreement on a single data value in a distributed system.

The term "feedback loop" may refer to a mutually dependent relationship between two parties in a given system.

The term "proof of work" may refer to a cryptographic process to ensure data security and/or uniformity.

The term "proof of record" may refer to a compression process using the consensus algorithm designed to create a tiered, access-oriented, and adjustable blockchain architecture used by the blockchain system described herein.

The term "SHA" may refer to Secure Hash Algorithm.

The term "SHA-2" may refer to a set of cryptographic hash functions designed by the United States National Security Agency.

The term "SHA256" may refer to a member of the SHA-2 cryptographic hash functions and may generate an almost-unique 256-bit data signature.

The term "w" may refer to a variable that represents a predefined minimum number of worker nodes.

The term "r" may refer to a variable that represents a predefined minimum number of recorder nodes.

The term "cw" may refer to a variable that represents a number of connected nodes that identified themselves as worker nodes in a particular stage.

The term "cr" may refer to a variable that represents a number of connected nodes that identified themselves as recorder nodes in a particular stage.

The term "n" may refer to a threshold block condition specifying the number of blocks included in the blockchain that causes compression to occur.

The term "barrier" may refer to any obstacle that prevents access to a resource, good, and/or service.

The term "access-oriented" may refer to a blockchain architecture that removes barriers.

The term "criteria" may refer to a set of rules that provide a means of quantifiable judgment as to whether to perform a function or not.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
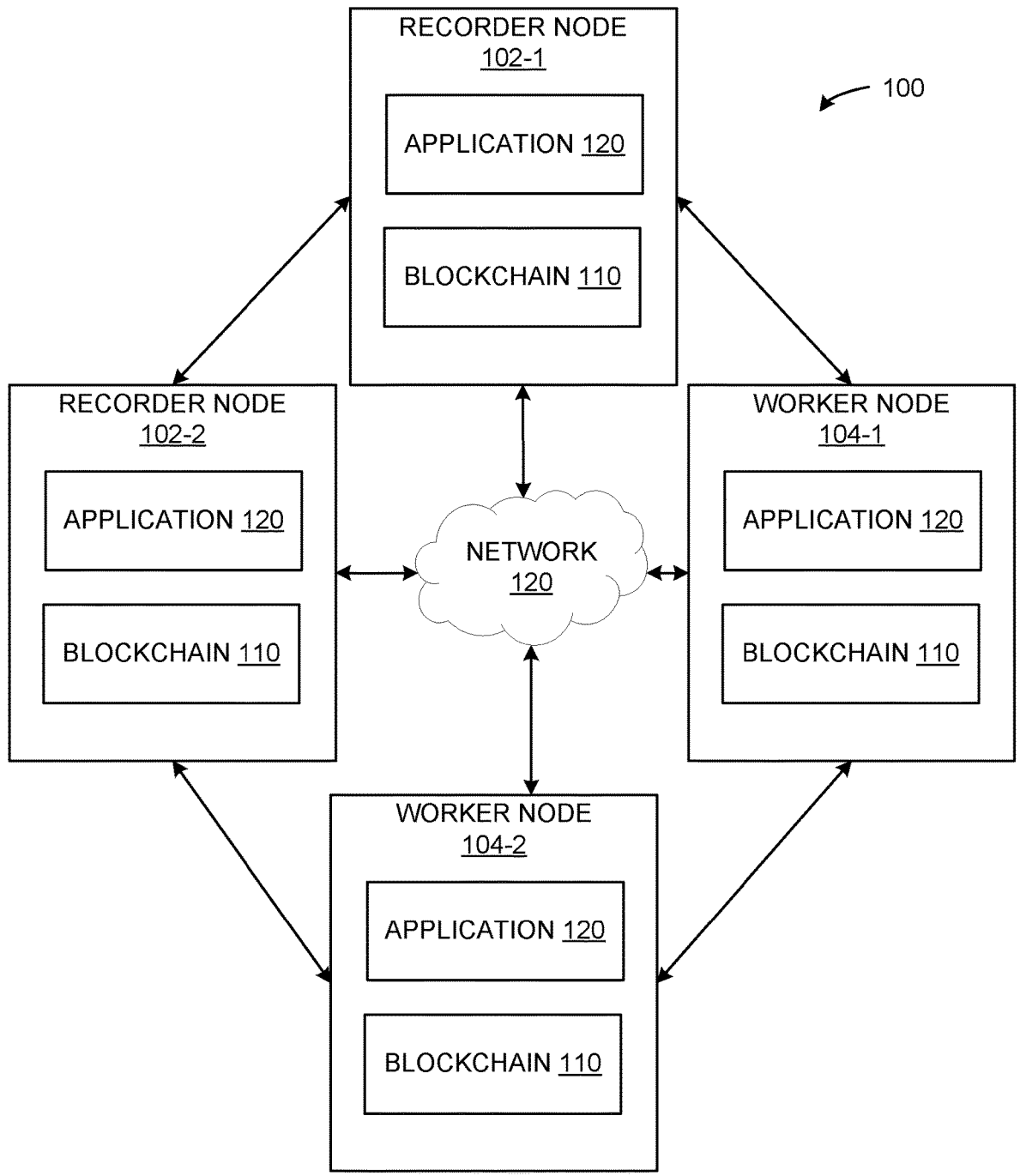
FIG. 1 illustrates a high-level component diagram of an illustrative blockchain system using the tiered, access-oriented blockchain architecture according to certain embodiments of this disclosure.

Blockchains may provide access to immutable records of information. Blockchains may be published to the public. Accordingly, since numerous computing devices (e.g. nodes) may alter the blockchain (e.g., by adding a new block), security is an important consideration when implementing a blockchain. Conventionally, to secure the blockchain, a proof of work is used that ensures reliable evidence that a significant amount of processing resources (such as time and/or processing resources) was used during the creation of a new block to be added to the blockchain. The Bitcoin implementation of blockchain requires a node to use processing resources to find a nonce value that, when hashed with the rest of a block header, results in a hash value which has a predetermined number of leading zeroes. Significant processing resources may be used to find the nonce value because the user typically has to perform numerous iterations until a suitable hash is found with the leading zeroes.

Also, conventional blockchain technologies, like Bitcoin, provide blockchains directly to all the participating nodes in a blockchain system. The blockchains may continue to grow in size as nodes add blocks for an unrestricted amount of time. As such, the blockchains may require a huge amount of data (e.g., over a couple hundred gigabytes) to download, store, and/or process, which creates a barrier to enter the blockchain system using the conventional blockchain technologies because some computing devices may not be able to download, store, and/or process the large blockchains. For example, some computing devices, such as mobile computing devices (e.g., cellular phones), older computing devices, and/or low-level computing devices (e.g., sensors, tags, etc.) may include memory devices with less than the required amount of data to download, store, and/or process the blockchains. Accordingly, users of those computing devices may be blocked from accessing conventional blockchain technologies.

Accordingly, aspects of the present disclosure generally relate to a tiered access-oriented blockchain architecture that uses a proof of record. As described herein, the proof of record may refer to an improved compression process including a consensus algorithm used to manage the blockchain in a blockchain system. The consensus algorithm may create and use a tiered system (e.g., 2 tier, 3 tier, 4 tier, or any suitable number of tiers greater than 1) of users using computing devices (e.g., nodes) to participate in a blockchain system. The management embodiments implemented by the consensus algorithm may provide numerous technical benefits over conventional blockchain architectures. For example, the disclosed embodiments may ensure scalability of the blockchain, increase accessibility for any type of nodes into the blockchain system, and reduce the resource consumption that results from conventional blockchain techniques.

In some embodiments, participating nodes in a blockchain system are classified as either recorder nodes or worker nodes. The decision regarding the class may be made by a user of a computing device that requests access to the blockchain system. In some embodiments, the blockchain system may implement rules that control the class of new nodes added. The recorder nodes may carry the full weight (e.g., entire blockchain data) of the blockchain and create checkpoints from which worker nodes may enter the blockchain system. The "checkpoints" may also be referred to as "genesis blocks" herein. The worker nodes may perform proof of work to add blocks to the blockchain and to verify blocks.

Homeostasis of the worker nodes and the recorder nodes may be created by a feedback loop between the two classes (recorder nodes and worker nodes). In general, the worker nodes engage in low difficulty proof of work-based functions beginning at every checkpoint in the blockchain. The recorder nodes generate new checkpoints or genesis blocks by hashing all the previous data from the last checkpoint. As a result, the disclosed embodiment may provide an access point to encourage and/or enable entry to the blockchain system and may reduce blockchain data storage requirements for the nodes participating in the blockchain system.

In some embodiments, after a threshold block condition is satisfied (e.g., a set number of blocks have been added to the blockchain after a genesis block), a determination is made whether a threshold node condition is satisfied. The threshold node condition may pertain to whether a minimum number of recorder nodes and/or worker nodes are participating in the blockchain system. "Participating in the blockchain system," when used in reference to a recorder node and/or a worker node may refer to that recorder node and/or that worker node being communicatively connected to a threshold number of nodes (e.g., recorder nodes and/or worker nodes) in the blockchain system at a certain time, as described further below.

If both the minimum number of recorder nodes and minimum number of worker nodes are participating in the blockchain system, the recorder nodes may rehash the blockchain by performing a hashing function (e.g., SHA256) on the information included in an initial genesis block and the blocks added to the initial genesis block to generate a subsequent genesis block. The hash value that is agreed upon by more than a threshold number of nodes in the blockchain system may be used as the hash value for the subsequent genesis block. As a result, the disclosed embodiments may reduce the amount of data storage needed to store the blockchain, while reducing the possibility of data loss. Like a clock resets to a certain time after a set amount of time has elapsed, the blockchain may be rehashed to a certain data size after a certain number of blocks have been added and a certain number of minimum nodes are participating in the blockchain system.

In some embodiments, the recorder nodes that generated the agreed upon hash value may be provided a reward. The reward may be split between these recorder nodes equally or in any suitable proportions. The reward may be a digital token and the reward may be associated with a certain worth to incentive the recorder nodes for maintaining the blockchain. However, recorder nodes may not be awarded the reward if the minimum number of worker nodes are not participating in the blockchain system. Such a practice may ensure the recorder nodes are not rewarded indefinitely. In such a scenario, the blockchain may be rehashed to generate a subsequent genesis block but the recorder nodes may not be rewarded. In some embodiments, new blocks may be added to the subsequent genesis block until the threshold block condition is satisfied again and the operations discussed above may be repeated.

When there are less than the minimum number of recorder nodes present when the threshold block condition is satisfied, the blockchain will not be rehashed and no rewards are provided to the recorder nodes. New blocks may be added to the existing blockchain with the initial genesis block until the threshold block condition is satisfied again and the threshold node condition is checked again. If the minimum number of recorder nodes are not participating in the blockchain system, this process may repeat until the minimum number of recorder nodes are participating. Such a technique may ensure that data may be secure and spread evenly throughout the blockchain system of nodes.

It should be noted that the embodiments disclosed herein may apply to any suitable industry and/or market where data security, data maintenance, data privacy, data scalability, and/or improved access for any suitable computing device is desired. For example, the disclosed techniques may provide benefits for financial transactions (e.g., money transfers, stock trading, etc.), supply chains, health industry (e.g., medical records, etc.), emergency services (e.g., police records), databases of all sorts, academic peer review scenarios, professional publication review scenarios, cyber security, and the like.

In some embodiments, using the power of cryptographic hash functions in the techniques disclosed herein may reduce millions of terabytes of information down to a set manageable amount (e.g., 32 bytes), while also eliminating barriers to entry or blockchain participation for any suitable computing device. In particular, there are areas of the world that have low-level technology devices and the disclosed blockchain architecture may allow those computing devices to benefit from the access to the blockchain and to securely maintain their data using the disclosed blockchain architecture.

It should be noted that the disclosed embodiments may be beneficial in situations where it is desired to prevent data from being deleted. For example, victims of sexual assault may provide reports in police records and those police records may be tampered with via hacking. The disclosed blockchain embodiments may securely store the police records and prevent any ill-willed people from being able to delete the police records.

As may be appreciated, the disclosed techniques provide solvency for a path forward to scale the accumulation of information using a secure blockchain that is made available to any suitable computing device.

FIGS. 1 through 7, discussed below, and the various embodiments used to describe the principles of this disclosure are by way of illustration only and should not be construed in any way to limit the scope of the disclosure.

FIG. 1 illustrates a high-level component diagram of an illustrative blockchain system 100 using the tiered, access-oriented blockchain architecture (also referred to herein as proof of record) according to certain embodiments of this disclosure. The blockchain system 100 may include one or more recorder nodes 102 (e.g., 102-1 and 102-2) and one or more worker nodes 104 (e.g., 104-1 and 104-2) that participate in the blockchain system 100. Accordingly, there are at least two tiers (classes) of participants in the blockchain system 100. Any suitable number of recorder nodes and worker nodes may participate in the blockchain system 100 and certain minimum numbers of the recorder nodes and worker nodes are used as checks to verify the blockchain system 100 is growing as desired. Additionally, other classes may be added to increase the number of tiers in the blockchain system 100.

Each of the recorder nodes 102 and the worker nodes 104 may be computing devices including at least one processing device, at least one memory device, and at least one network device. The recorder nodes 102 and the worker nodes 104 may be communicatively coupled to one another in a distributed fashion (e.g. a peer-to-peer network). The network devices may enable communication via a wireless protocol for transmitting data over short distances, such as Bluetooth, ZigBee, NFC, etc. Additionally, the network devices may enable communicating data over long distances, and in one example, the recorder nodes 102 and the worker nodes 104 may communicate with a network 112. Network 112 may be a public network (e.g., connected to the Internet via wired (Ethernet) or wireless (WiFi)), a private network (e.g., a local area network (LAN) or wide area network (WAN)), or a combination thereof. Network 112 may also comprise a node or nodes on the Internet of Things (IoT).

The nodes 116 may be associated with any suitable user in any suitable industry, market, and/or ecosystem. For example, some of the users may include a service provider (e.g., emergency service provider (e.g., administrator, police officer, firefighter, emergency medical service user, etc.), medical personnel user, such as a physician, dentist, pharmacist, optometrist, orthodontic, nurse, etc.), a facility (e.g., medical facility user), a patient user, a victim user, a financial user, a legal user, a professional user, and/or the like.

Each recorder node 102 and worker node 104 store the blockchain 110. The blockchain 110 may be any suitable type of blockchain. There are different kinds of blockchains, such as permission-less and permissioned. In a permission-less blockchain, any user may participate without an identity. In a permissioned blockchain, each entity that participates in the blockchain is identified and known. An example of a permissioned blockchain is a distributed ledger (e.g., a hyperledger). Permissions may cause the participating nodes to view only the appropriate transactions in the distributed ledger. Programmable logic may be implemented as rules and/or smart contracts that are executed on the blockchain 110. Some or all of the operations of any method described herein may be implemented in programmable logic executed on the blockchain 110.

Each user may be associated with a respective computing device that they use to register as a node on the blockchain system 100 and request transactions to be performed using a blockchain 110. During registration, each user may provide certain information pertaining to the user to be maintained by the blockchain 110 at the nodes. For example, the user may request whether they are to participate as a recorder node 102 or a worker node 104 in the blockchain system 100. Each node may maintain a respective copy of the blockchain 110 as a shared single source of truth.

To elaborate, a request may be received from a computing device to join the blockchain system 100. The computing device may be a node that identifies itself upon joining the blockchain system 100 and the request may include whether the node is joining as a recorder node 102 or a worker node 104. Upon joining the blockchain system based on the information in the request, the node requests to download the blockchain 110 up to its current state. The compression process described in the embodiments presented herein may ensure that the blockchain length that is to be downloaded does not exceed the previously determined n, number of blocks, thereby enabling ease of access for mobile devices, as well as low memory devices, that can be attached to packages, produce, and various other secure transportation methods or apparatuses.

Blocks are accepted into the blockchain 110 through proof of work techniques described herein. This technique starts at the initial genesis block and continues until the blockchain length reaches the predetermined integer value n, at which point some of the present embodiments proceed to a next step in an improved blockchain compression process by determining whether a threshold node condition is satisfied prior to proceeding to compress the blockchain via rehashing.

Computer instructions may be implemented that perform one or more of the operations of one or more of the methods described herein and may reside on and be executed by one or more of the recorder nodes 102 and/or the worker nodes 104. Each of recorder nodes 102 and the worker nodes 104 may be any suitable computing device, such as a server, laptop, tablet, smartphone, or computer. Each of recorder nodes 102 and the worker nodes 104 may include a display that is capable of presenting a user interface of an application 120. The application 120 may be implemented in computer instructions stored on the one or more memory devices of each of recorder nodes 102 and the worker nodes 104 and executable by the one or more processing devices of each of recorder nodes 102 and the worker nodes 104. The application 120 may enable a user to make transaction requests to use the blockchain 110 and/or interact with the blockchain 110.

For example, in some embodiments, the user may make requests to report certain incidents. In some embodiments, the user may request their identity to remain anonymous when making the incident report (e.g., police report). The blockchain 110 may be used to securely store the incident reports without a possibility of the incident reports being deleted.

After reporter nodes 102 and worker nodes 104 are participating in the blockchain system 100, an initial genesis node may be generated by a node 102 and/or 104 in the blockchain system 100. The node may execute computer instructions that specify how to generate the initial genesis node. For example, the computer instructions may specify the variables to use to generate the initial genesis block, a hash function to execute to obtain a hash of the initial genesis block, a nonce value, and the like. A genesis block may not refer to any previous blocks, since the genesis block is the first block in the blockchain 110.

After the initial genesis block is created and added to the blockchain 110, in some embodiments, the nodes 102 and/or 104 may use a proof of work technique to add additional blocks to the blockchain 110. The proof of work technique may hash together sender information, receiver information, previous block header, information, accompanying transaction information for all transactions in the blocks of the blockchain 110, a nonce variable, and the like.

The hash that is output may include an assortment of leading 0's prior to the block being added to the blockchain 110. As such, several iterations of the proof of work concept may be performed until a nonce variable is identified that provides the appropriate leading 0's in the hash. The first node 102 or 104 to achieve a correct hash for a given set of data may be provided a first reward (e.g., digital token) for successfully performing the proof of work technique. The value of the first reward may be commensurate with the function performed (e.g., since the proof of work technique was performed for one block, the value of the reward may be one). After the block is added to the blockchain 110, the node that calculates the correct hash broadcasts the corresponding block to the other nodes to update their respective blockchains.

Instead of allowing a size of a blockchain to grow unbounded as the proof of work technique continues to be performed, like conventional blockchain technologies, some of the disclosed embodiments use a preset blockchain length n, to act as a threshold block condition for blockchain reduction. At every n number of blocks that have been secured through the proof of work technique, the worker nodes 104 and the recorder nodes 102 are analyzed to determine whether a threshold node condition is satisfied (e.g., a minimum number of recorders r and a minimum number of workers w are participating in the blockchain system 100). It should be understood that the number of blocks n may be a configurable amount that may be dynamically changed by one or more of the nodes upon satisfactory agreement between the nodes of the blockchain system 110. The number of blocks n may be set to a default number, for example, 1,000 blocks.

When the minimum number of the recorders r and the workers w are met, the recorder nodes and the worker nodes perform a rehash of all blockchain data from each block (e.g., the initial genesis block and subsequent blocks added after the initial genesis block) in the blockchain 110 using a cryptographic hashing function (e.g., SHA256) to generate a next subsequent genesis block. Since all data is rehashed by both the recorder nodes 102 and the worker nodes 104 individually, each node broadcasts their hash to the other nodes in the blockchain system 100. A hash that is agreed and/or approved by more than a threshold number or percentage (e.g., >50%) of nodes in the blockchain system 100 may be selected as the new subsequent genesis block hash.

In some embodiments, from this point forward, the worker nodes 104 accept the hash of the subsequent genesis block and continue the proof of work technique using the subsequent genesis block with the option of removing some or all other information from the blockchain 110 at their discretion. Removing some or all other information at their discretion may enable reducing the memory footprint on the worker nodes 104, thereby saving memory resources and allowing access to the blockchain system 110 to computing devices with lower available storage space who choose to be worker nodes 104.

The recorder nodes are tasked with continuing the blockchain 110 from the last block n, while maintaining the previous data from the blockchain 110. Any recorder node that correctly calculates the new hash for the subsequent genesis block may receive a second reward that has a worth more valuable than the first reward (e.g., the second reward is one thousand times more valuable than the first reward). In some embodiments, the second reward is a lump sum and each recorder node that correctly calculates the new hash receives a portion of the lump sum (e.g., each recorder node receives an equal portion).

In instances, where the minimum number of recorders r is not met, the blockchain 110 may continue from the previous block for another n number of blocks without rehashing of data and no rewarding of the second reward. Such a technique aids in causing an adequate population of recorder nodes 102 to participate in the blockchain system 110 when the rehashing of the blockchain 110 occurs. At the point where a total of n blocks have passed after the last attempted blockchain rehashing (e.g., the threshold block condition is satisfied), a determination may be made by the nodes 102 and 104 whether the minimum number of recorder nodes 102 are participating in the blockchain system 100. This process may be repeated indefinitely, or a certain number of times, until the minimum number of recorder nodes 102 are participating in the blockchain system 100.

In instances, where the minimum number of workers w is not met but the minimum number of recorders r is met, the recorder nodes 102 and the worker nodes 104 may rehash the existing data in the blockchain 110 and continue with the generation of a subsequent genesis block. In such an embodiment, no reward may be provided to any of the recorder nodes 102.

Determining when to provide the reward to the recorder nodes 102 as described herein may ensure that recorder nodes 102 are not being rewarded for a blockchain 110 in a blockchain system 100 with little to no participants, while also keeping the blockchain 110 access-oriented in a feedback loop between these two tiers of nodes (e.g., recorder nodes and worker nodes).

Figure 2:
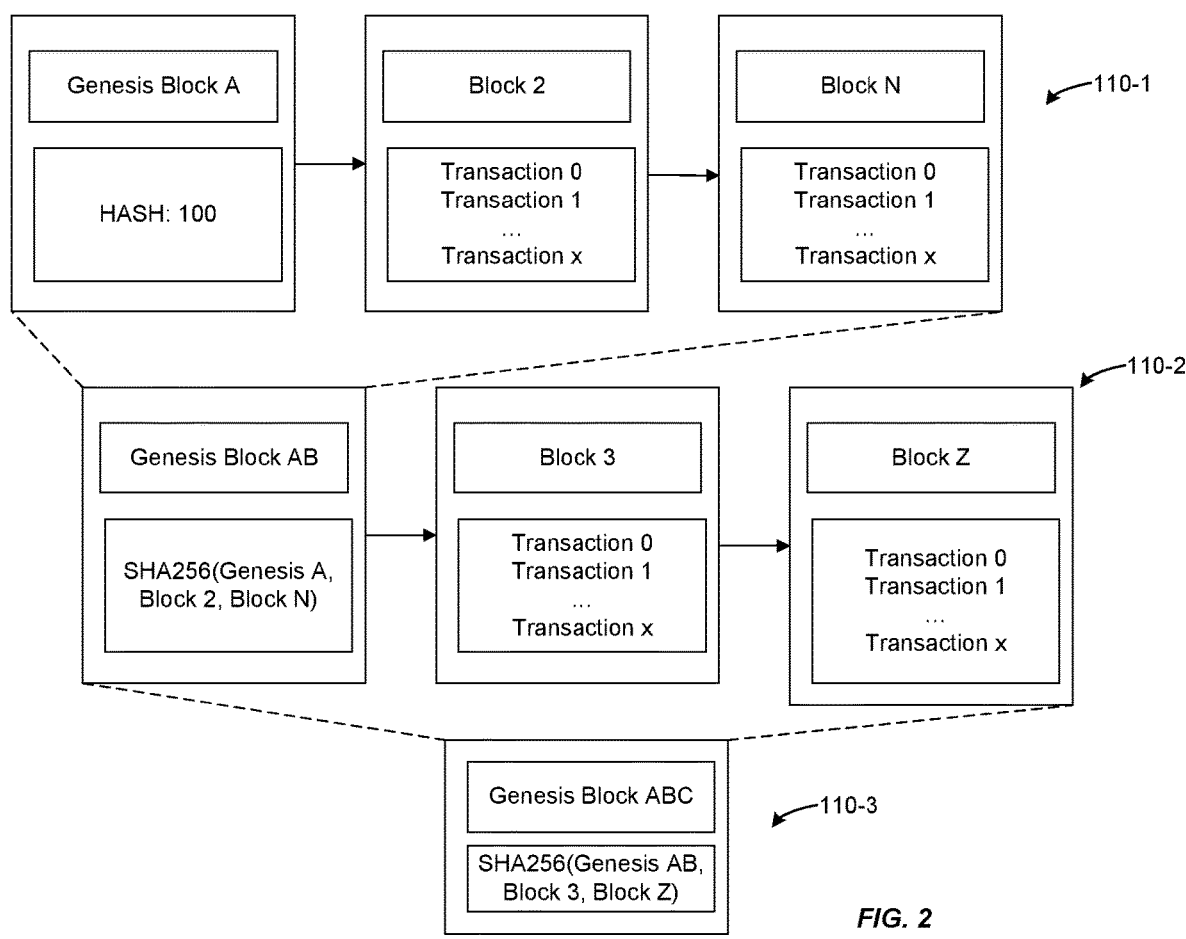
FIG. 2 illustrates an example of generating a subsequent genesis block using the blockchain system depicted in FIG. 1 according to certain embodiments of this disclosure.

FIG. 2 illustrates an example of generating a subsequent genesis block by rehashing a blockchain according to certain embodiments of this disclosure. Blocks in the blockchain 110 may include various data, such as a list of transactions, metadata accompanying each transaction, a hash, an iterable value referred to as a nonce variable, and the like. As described above, the blocks are secured into the blockchain 110 with the various data using the proof of work technique. Rewards may be provided to the node that correctly identifies a corresponding hash for a set of data corresponding to the blocks already secured in the blockchain 110.

In the example in FIG. 2, three blockchains 110-1, 110-2, and 110-3 are depicted. The blockchains 110-1, 110-2, and 110-3 may represent the same blockchain 110 at different points in time after the disclosed techniques are performed. For example, blockchain 110-1 represents the blockchain 110 prior to the blockchain 110 being compressed via rehashing, blockchain 110-2 represents the blockchain 110 after the blockchain is rehashed for a first time, and blockchain 110-3 represents the blockchain 110 after the blockchain is rehashed for a second time.

The blockchain 110-1 includes Genesis Block A (e.g., initial genesis block) including a hash "100", Block 2 including a list of transactions, and Block N also including a list of transactions. In some instances, Block 2 and Block N may be referred to as subsequent blocks herein because they are added subsequent to the initial block in the blockchain 110. In some embodiments, when a threshold block condition and a threshold node condition is satisfied, compression of the blockchain 110-1 via rehashing may be performed. For example, if a minimum number of recorders 102 and/or workers 104 are connected to each node at least a certain number of blocks (e.g., 10) prior to the time at which the blockchain 110 reaches n number of blocks, then in some embodiments, the blockchain 110-1 may be rehashed to generate a subsequent genesis block (e.g., Genesis Block B).

To continuously or continually mark the iterations of subsequent genesis blocks, each genesis block may be hashed together with other blocks in the blockchain in a process similar to a hash tree. That is, a hashing function may be used to map input data (blockchain 110-1) having a variable size to a fixed size output (Genesis Block B) and completely unique to the input data, thereby providing data integrity.

To compress blockchain 110-1, Genesis Block A and all data up to and including Block N after Genesis Block A may be hashed together to output hash B. Upon completing this process, each recorder node 102 and each worker node 104 in the blockchain system 100 has both the hash ("100") for Genesis Block A and the hash B. These two hashes may be rehashed together to create the hash for a subsequent genesis block referred to as Genesis Block AB in the blockchain 110-2 of FIG. 2. As depicted, the hash function SHA256 was used with the input of Genesis Block A, Block 2, and Block N. This process may be continually repeated during compression as the threshold block condition and/or the threshold node condition are satisfied.

For example, during the next iteration, the Genesis Block AB may be hashed with the entirety of the hashed information immediately after Genesis Block AB, which may include Block 3, and Block Z, to output hash C. Hash C may be hashed with the hash of Genesis Block AB (e.g., the result of SHA256(Genesis Block A, Block 2, Block N)) and hash C to obtain the hash (e.g., the result of SHA256(Genesis AB, Block 3, Block Z) of another subsequent genesis block (e.g., Genesis Block ABC) in blockchain 110-3. The rehashing of blockchain 110-2 including Genesis Block AB, Block 3, and Block Z may generate Genesis Block ABC in the blockchain 110-3. This process may continue indefinitely or for a desired amount of time that may be configurable.

FIGS. 3A-3D illustrate example operations of methods 300, 330, 340, and 350 for rehashing a blockchain according to certain embodiments of this disclosure.

Figure 3A:
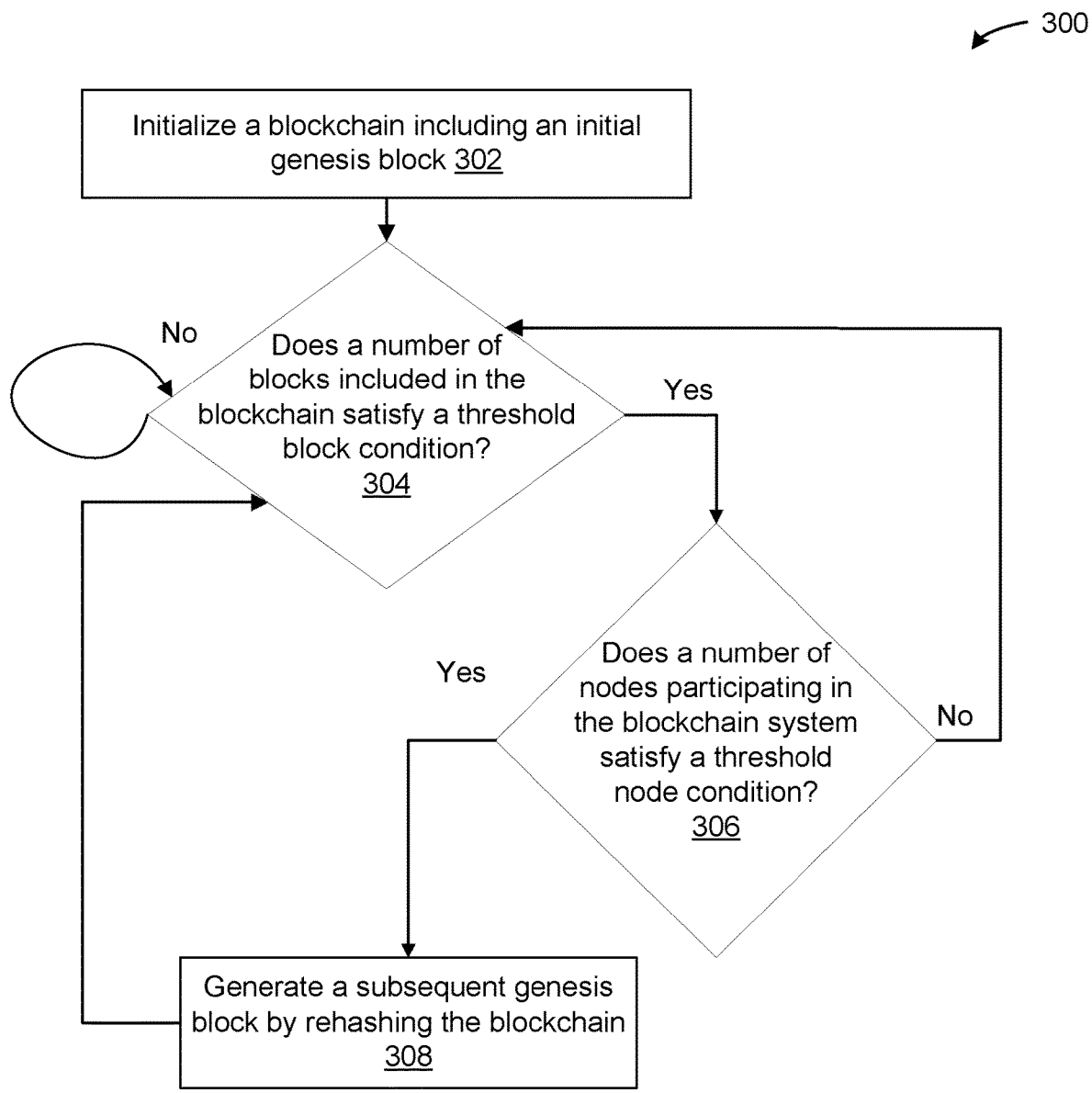
FIGS. 3A-3D illustrate example operations of a method for rehashing a blockchain according to certain embodiments of this disclosure.

Regarding FIG. 3A, the method 300 may include operations for maintaining a blockchain 110 in a blockchain system 100, where the operations may by processing logic that may include hardware (circuitry, dedicated logic, etc.), software (such as is run on a general purpose computer system or a dedicated machine), or a combination of both. The method 300 and/or each of their individual functions, routines, subroutines, or operations may be performed by one or more processors of a computing device (e.g., any component or combination of components of the blockchain system 100 of FIG. 1, such as recorder node 102, worker node 104, etc.). In certain implementations, the method 300 may be performed by a single processing thread. Alternatively, the method 300 may be performed by two or more processing threads, each thread implementing one or more individual functions, routines, subroutines, or operations of the methods.

For simplicity of explanation, the method 300 is depicted and described as a series of operations. However, operations in accordance with this disclosure can occur in various orders and/or concurrently, and with other operations not presented and described herein. For example, the operations depicted in the method 300 may occur in combination with any other operation of any other method disclosed herein. Furthermore, not all illustrated operations may be required to implement the method 300 in accordance with the disclosed subject matter. In addition, those skilled in the art will understand and appreciate that the method 300 could alternatively be represented as a series of interrelated states via a state diagram or events.

At 302, the processing device may initialize the blockchain 110 including the initial genesis block (e.g., Genesis Block A). The nodes in the blockchain system 100 may add subsequent blocks after the initial genesis block to the blockchain 110 using the proof of work technique described above, for example.

At 304, the processing device may determine whether a number of blocks included in the blockchain 110 satisfies a threshold block condition. The blocks may include an initial genesis block and one or more subsequent blocks. The threshold block condition may include a number of blocks n being secured to the blockchain 110 after the initial genesis block. If the threshold block condition is not satisfied, the processing device may continue to add blocks to the blockchain 100 and may repeat 304 to determine whether the threshold block condition is satisfied.

At 306, responsive to determining the number of blocks in the blockchain satisfies the threshold block condition, the processing device may determine whether a number of nodes participating in the blockchain system satisfies a threshold node condition. The nodes may include a set of recorder nodes 102 and a set of worker nodes 104.

The threshold node condition may be used to determine when to compress the blockchain 100 by performing rehashing using a suitable hashing function (e.g., SHA256). The threshold node condition may be satisfied in two situations (i) when a minimum number of recorder nodes 102 and a minimum number of worker nodes 104 are participating in the blockchain system 100, and (ii) when a minimum number of recorders nodes but not a minimum number of worker nodes are participating in the blockchain system 100. In some embodiments, the threshold node condition may be satisfied when a minimum number of recorder nodes 102 and/or a minimum number of worker nodes 104 are connected to each node in the blockchain system 100 at least a certain number of blocks (e.g., 10) prior to the time at which the blockchain reaches the n number of blocks.

If the threshold node condition is not satisfied, for example, a minimum number of recorders are not participating in the blockchain system 100 at the particular time, then the processing device may not rehash the blockchain 110, continue to add blocks to the blockchain 110, and repeat 304 until the threshold block condition is satisfied again. If the threshold block condition is satisfied again, the processing device may determine whether the threshold node condition is satisfied at 306, and if so, may proceed to 308.

At 308, the processing device may generate a subsequent genesis block (e.g., Genesis Block AB) by rehashing the blockchain 110 as described herein. In some embodiments, rehashing the blockchain 110 may include rehashing the initial genesis block and the one or more subsequent blocks in the blockchain 110 to generate the subsequent genesis block. The processing device may add another subsequent block after the subsequent genesis block in the blockchain using the proof of work technique described above, for example. This process of adding subsequent blocks to the blockchain including the subsequent genesis block may continue until the threshold block condition is satisfied again at 304, at which point the processing device may determine whether the threshold node condition is satisfied at 306. If so, the blockchain 110 may be compressed again to generate another subsequent genesis block (e.g., Genesis Block ABC) by rehashing the blockchain 110.

Figure 3B:
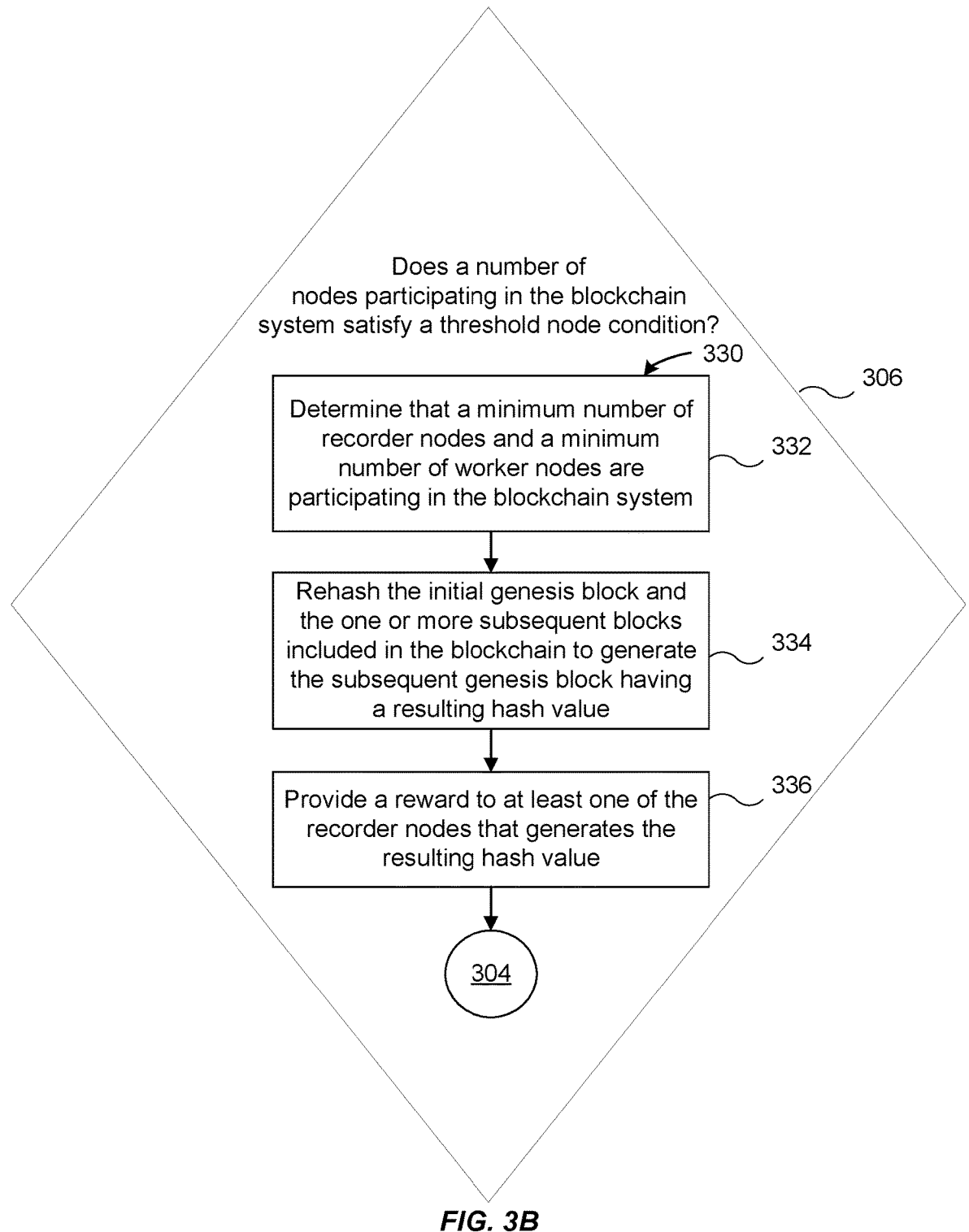
Figure 3C:
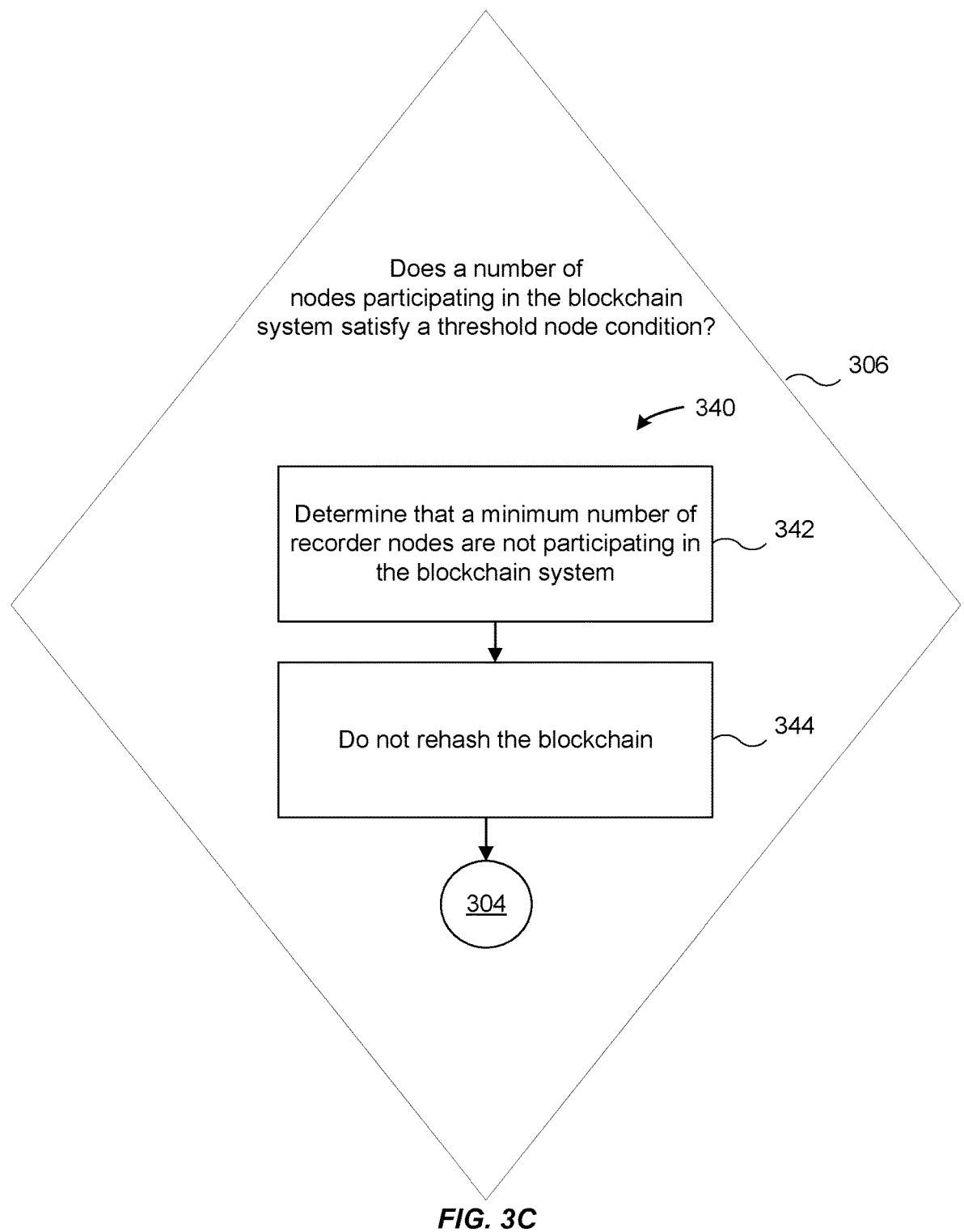
Figure 3D:
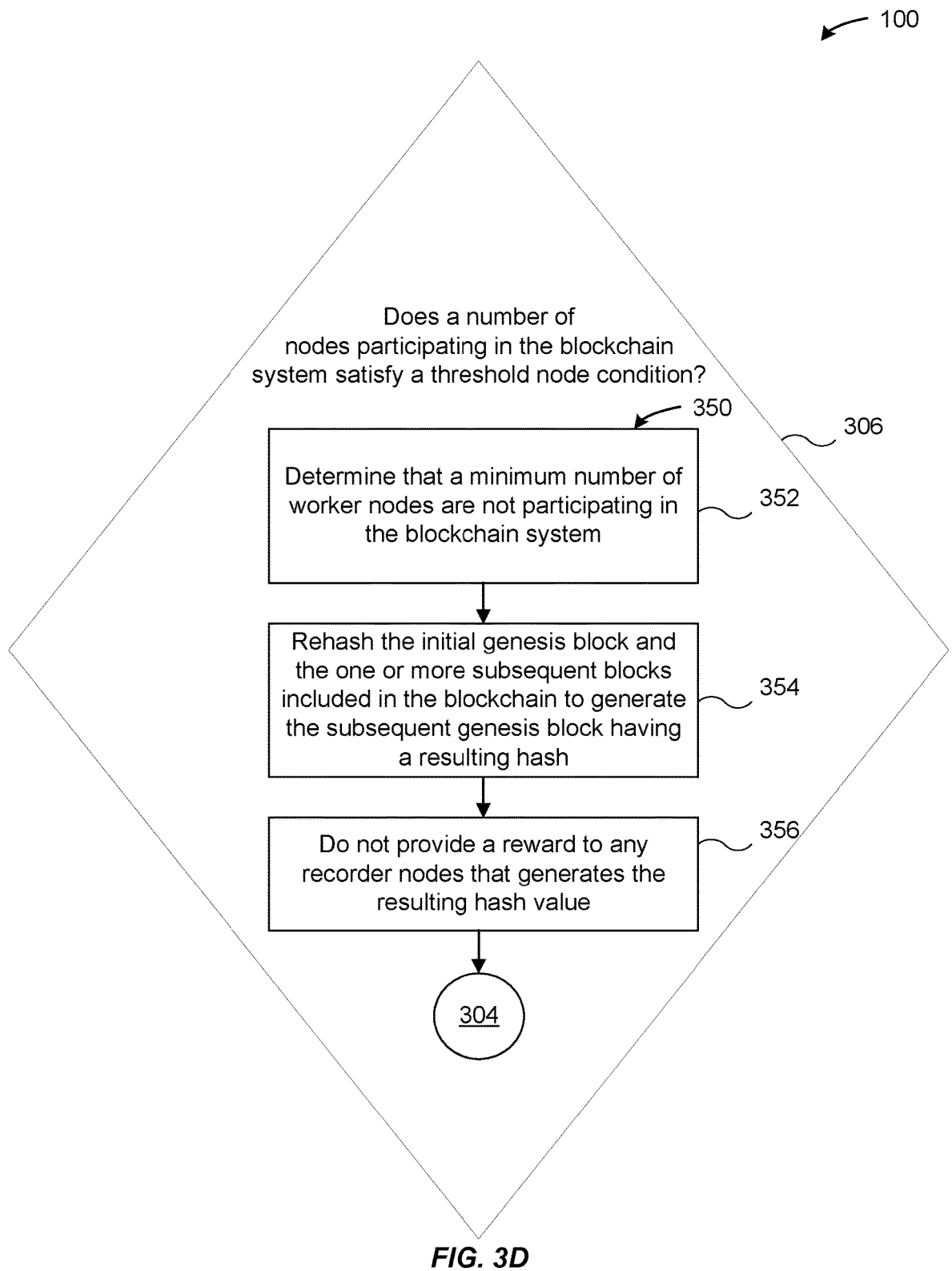

FIGS. 3B-3D include different respective methods 330, 340, and 350 that include operations that may be performed as part of operation 306 (e.g., determining whether the number of nodes participating in the blockchain system 110 satisfies a threshold node condition) from the previously-described method 300 depicted in FIG. 3.

Regarding FIG. 3B, the method 330 includes operations performed by processors of a computing device (e.g., any component or combination of components of the blockchain system 100 of FIG. 1, such as recorder node 102, worker node 104, etc.). In some embodiments, one or more operations of the method 330 are implemented in computer instructions that are stored on a memory device and executed by a processing device. The method 330 may be performed in the same or a similar manner as described above in regards to method 300. The operations of the method 330 may be performed in some combination with any of the operations of any of the methods described herein.

At 332, the processing device may determine that a minimum number of recorder nodes and a minimum number of worker nodes are participating in the blockchain system.

Responsive to determining the minimum number of the recorder nodes 102 are participating in the blockchain system 100 and the minimum number of the worker nodes 104 are participating in the blockchain system 100, the processing device may rehash (334) the initial genesis block and the one or more subsequent blocks included in the blockchain to generate the subsequent genesis block having a resulting hash, and the processing device may provide (336) a reward to at least one of the recorder nodes that generates the resulting hash value. The type of compression that is performed via rehashing when both minimum number of recorder nodes 102 and minimum number of worker nodes 104 are participating in the blockchain system may be referred to as "proper compression" herein.

Proper compression may use a set of cryptographic hash functions (e.g., SHA256) to hash the data of the blockchain 110. In proper compression, the recorder nodes 102 and the worker nodes 104 both hash their previously prepared blockchain data using the cryptographic hash function. After hashing the entirety of the blockchain 110 in its prepared state (as described further with reference to FIG. 6), each node proceeds to broadcast the calculated resulting hash value to the other nodes in the blockchain system 100.

Providing the reward to the at least one of the recorder nodes 102 that generates the resulting hash value may include broadcasting the resulting hash value of the subsequent genesis block to other recorder nodes 102 and to the worker nodes 104 participating in the blockchain system 100. The processing device may also determine that a threshold consensus criteria pertaining to the resulting hash value is satisfied. The threshold consensus criteria may include at least a percentage (e.g., 51%) of the recorder nodes 102 and the worker nodes 104 approving the resulting hash value.

The reward may be calculated using the following relationship:

$$\sum_{\square=0}^{\square=32} \frac{210\left[50*10^8*(1/2)^\square\right]}{10^8} \qquad \text{Equation}$$

Conventional reward systems in conventional blockchain technologies may monopolize the computationally expensive proof of work system in their design, thereby centralizing around different parties like cryptocurrency exchanges, mining groups, and other parties dedicated to act as middlemen in a decentralized blockchain system. Accordingly, some embodiments of the present disclosure improve the rewards system by using a new genesis block creation reward for recorder nodes 102 during the compression process.

In some embodiments, the processing device may distribute the reward equally among each reorder node that computes the resulting hash value approved for the subsequent genesis block. Any suitable proportion may be used to distribute the reward. Responsive to providing the reward to at least one of the recorder nodes 102, the processing device may receive, from the at least one recorder node, broadcasted data associated with the blockchain 110 used to generate the subsequent genesis block.

In some embodiments, at least one worker node 104 may encode the reward into another subsequent block that is added to the blockchain 110 after the subsequent genesis block. The processing device may return to 304 of the method 300 depicted in FIG. 3A.

Regarding FIG. 3C, the method 340 includes operations performed by processors of a computing device (e.g., any component or combination of components of the blockchain system 100 of FIG. 1, such as recorder node 102, worker node 104, etc.). In some embodiments, one or more operations of the method 340 are implemented in computer instructions that are stored on a memory device and executed by a processing device. The method 340 may be performed in the same or a similar manner as described above in regards to method 300. The operations of the method 340 may be performed in some combination with any of the operations of any of the methods described herein.

At 342, the processing device may determine whether a minimum number of recorder nodes 102 are participating in the blockchain system 100.

At 344, responsive to determining the minimum number of the recorder nodes are not participating in the blockchain system 100, the processing device may continue to use the blockchain 100 without rehashing the initial genesis block and the one or more subsequent blocks. Further, the processing device may return to 304 of the method 300 depicted in FIG. 3A.

Regarding FIG. 3D, the method 350 includes operations performed by processors of a computing device (e.g., any component or combination of components of the blockchain system 100 of FIG. 1, such as recorder node 102, worker node 104, etc.). In some embodiments, one or more operations of the method 350 are implemented in computer instructions that are stored on a memory device and executed by a processing device. The method 350 may be performed in the same or a similar manner as described above in regards to method 300. The operations of the method 350 may be performed in some combination with any of the operations of any of the methods described herein.

At 352, the processing device may determine whether a minimum number of worker nodes 104 are participating in the blockchain system 100. This operation may include determining whether a minimum number of recorder nodes 102 are participating in the blockchain system 100.

At 354, responsive to determining the minimum number of worker nodes 104 are not participating in the blockchain system 100 (but the minimum number of recorder nodes 102 are participating in the blockchain system 100), the processing device may rehash (354) the initial genesis block and the one or more blocks included in the blockchain to generate the subsequent genesis block without providing (356) a reward to any recorder nodes 102 participating in the blockchain system 100. The type of compression that is performed via rehashing when a minimum number of worker nodes 104 are not participating in the blockchain system may be referred to as "improper compression" herein.

Improper compression may be similar to proper compression described above but does not reward the recorder nodes 102 for having properly recorded the blockchain information/computed the resulting hash value of the next subsequent genesis block. The present disclosure removes the barriers to enter the blockchain system 100, but in some embodiments, does not reward an essentially "empty" blockchain system 100. Thus, when the minimum number of worker nodes w is not met, the blockchain does not reward recorder nodes 102, creating a feedback loop that is dependent on both recorder nodes 102 and worker nodes 104.

Further, the processing device may return to 304 of the method 300 depicted in FIG. 3A.

Figure 4:
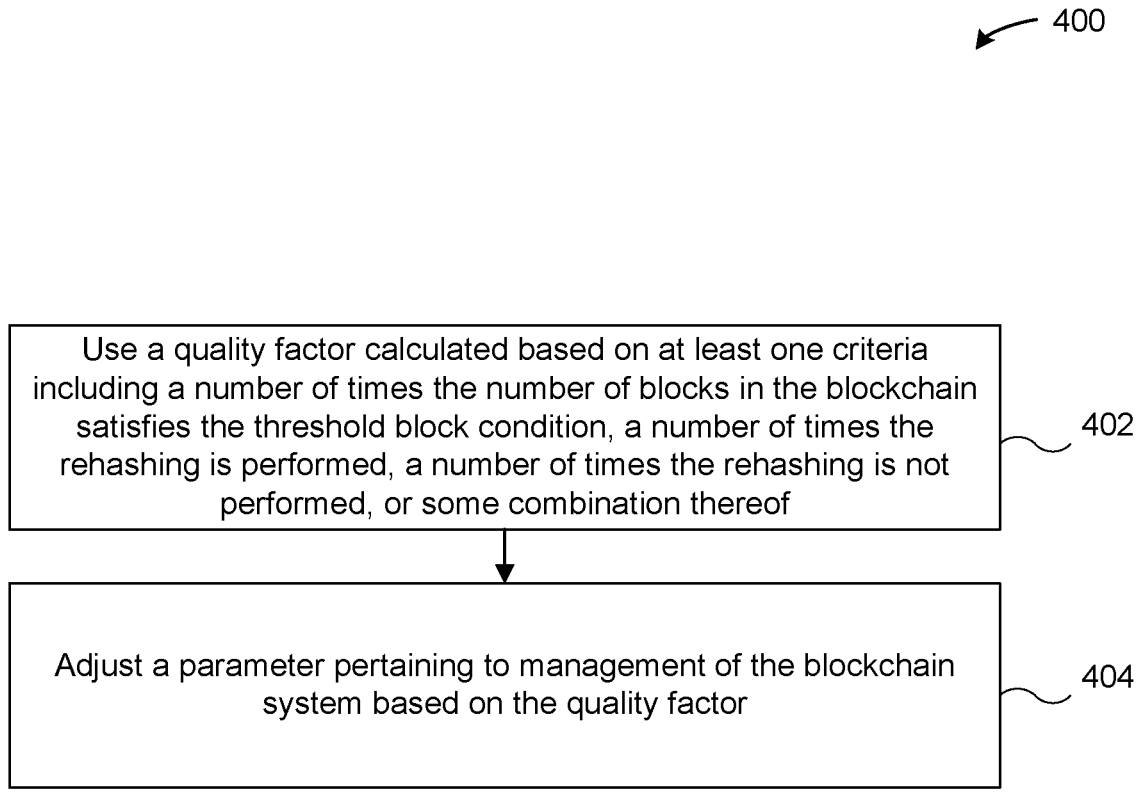
FIG. 4 illustrates example operations of a method for using a quality factor to adjust a parameter of a blockchain system according to certain embodiments of this disclosure.

FIG. 4 illustrates example operations of a method 400 for using a quality factor to adjust a parameter of a blockchain system according to certain embodiments of this disclosure. The method 400 includes operations performed by processors of a computing device (e.g., any component or combination of components of the blockchain system 100 of FIG. 1, such as recorder node 102, worker node 104, etc.). In some embodiments, one or more operations of the method 400 are implemented in computer instructions that are stored on a memory device and executed by a processing device. The method 400 may be performed in the same or a similar manner as described above in regards to method 300. The operations of the method 400 may be performed in some combination with any of the operations of any of the methods described herein.

In some embodiments, a quantity z may be used to dictate a quality factor for the blockchain adjustability. Given several iterations of the blockchain compression process, certain parameters may be adjusted to provide desired performance (e.g., resource usage), accessibility, and/or scalability.

At 402, the processing device may use a quality factor calculated based on at least one criteria including a number of times the number of blocks in the blockchain 110 satisfies the threshold block condition, a number of times the rehashing is performed, a number of times the rehashing is not performed, or some combination thereof. The following relationship may be used to calculate the quality factor:

$$\square = \frac{\dfrac{\square!}{\square!(\square-\square)!} + \dfrac{\square!}{\square!(\square-\square)!}}{\dfrac{\square!}{\square!(\square-\square)!)} + \dfrac{\square!}{\square!(\square-\square)!} + \dfrac{\square)!\square!}{\square!(\square-\square)!)}} \qquad \text{Equation}$$

Here the quantity y is the number of times n blocks has been reached since the genesis block, a represents the number of proper compressions, b the number of improper compressions, and c the number of no compressions that have happened. When this quantity factor z is less than a threshold (e.g., 50%), then a parameter pertaining to the management of the blockchain may be adjusted (404) until the agreed upon minimum number of recorder nodes and the minimum number of worker nodes are participating in the blockchain system 100. Such a technique may create a feedback loop between the recorder nodes 102 and the worker nodes 104 in the blockchain system 100. The minimum numbers of recorder nodes 102 and the minimum number of worker nodes 104 may ensure that the blockchain system 100 remains access-oriented based upon requiring a certain population of recorder nodes 102 and worker nodes 104 participating in the blockchain system 100.

Figure 5:
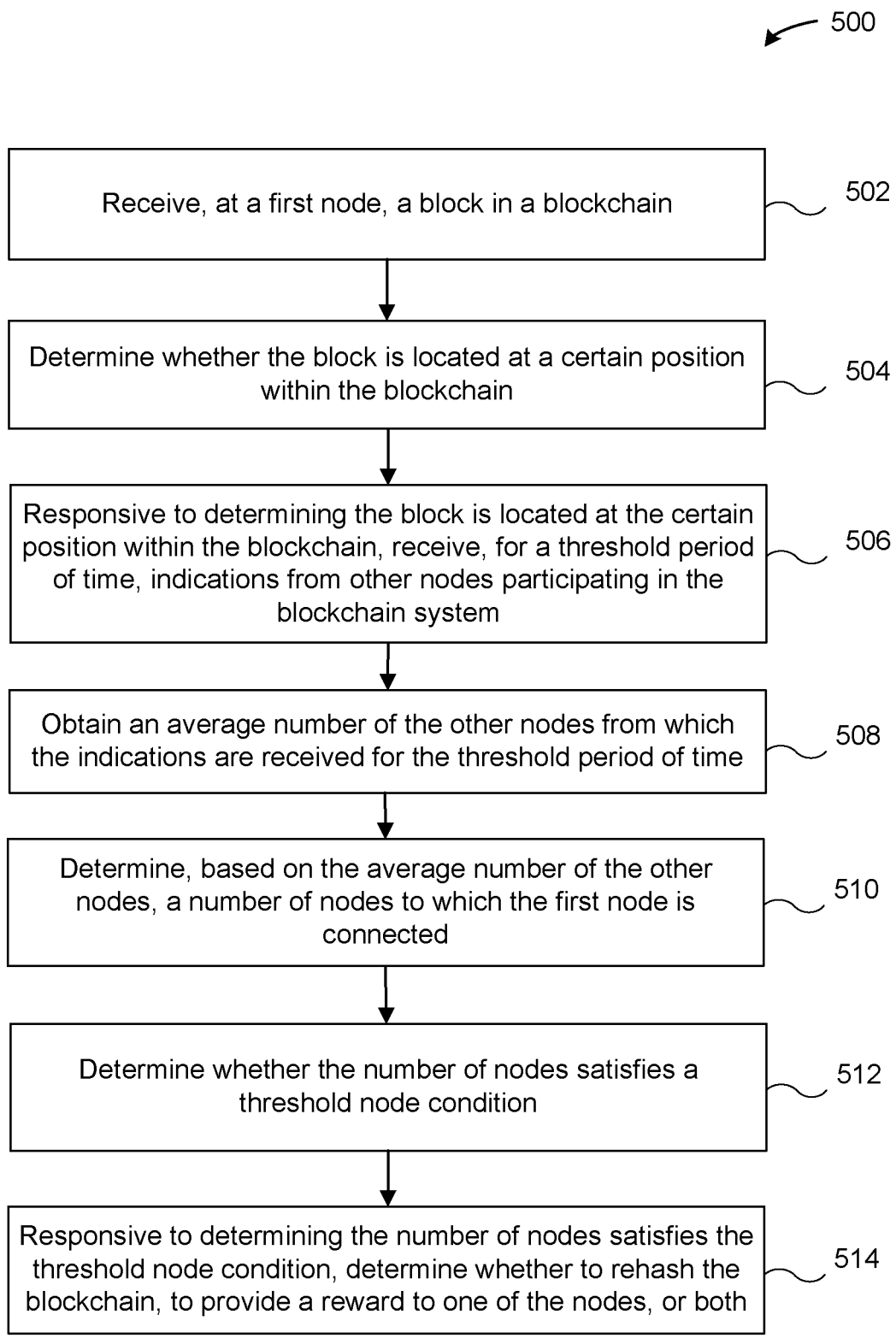
FIG. 5 illustrates example operations of a method for performing node signaling according to certain embodiments of this disclosure.

FIG. 5 illustrates example operations of a method 500 for performing node signaling according to certain embodiments of this disclosure. The method 500 includes operations performed by processors of a computing device (e.g., any component or combination of components of the blockchain system 100 of FIG. 1, such as recorder node 102, worker node 104, etc.). In some embodiments, one or more operations of the method 500 are implemented in computer instructions that are stored on a memory device and executed by a processing device. The method 500 may be performed in the same or a similar manner as described above in regards to method 300. The operations of the method 500 may be performed in some combination with any of the operations of any of the methods described herein.

At 502, the processing device may receive, at a first node, a block that has been added to the blockchain 110. At 504, the processing device may determine whether the block is located at a certain position within the blockchain 110. The certain position may be a preset number of blocks (e.g., 10) before a last block in the blockchain 110 of length n. At 506, responsive to determining the block is located at the certain position within the blockchain 110, the processing device may receive, for a threshold period of time, indications from other nodes participating in the blockchain system 100. At 508, the processing device may obtain an average number of the other nodes from which the indications are received for the threshold period of time. At 510, the processing device may determine, based on the average number of the other nodes, a number of nodes to which the first node is connected. At 512, the processing device may determine whether the number of nodes satisfies a threshold node condition. At 514, responsive to determining the number of nodes satisfies the threshold node condition, the processing device may determine whether to rehash the blockchain 110, to provide a reward to one of the nodes, or both.

Figure 6:
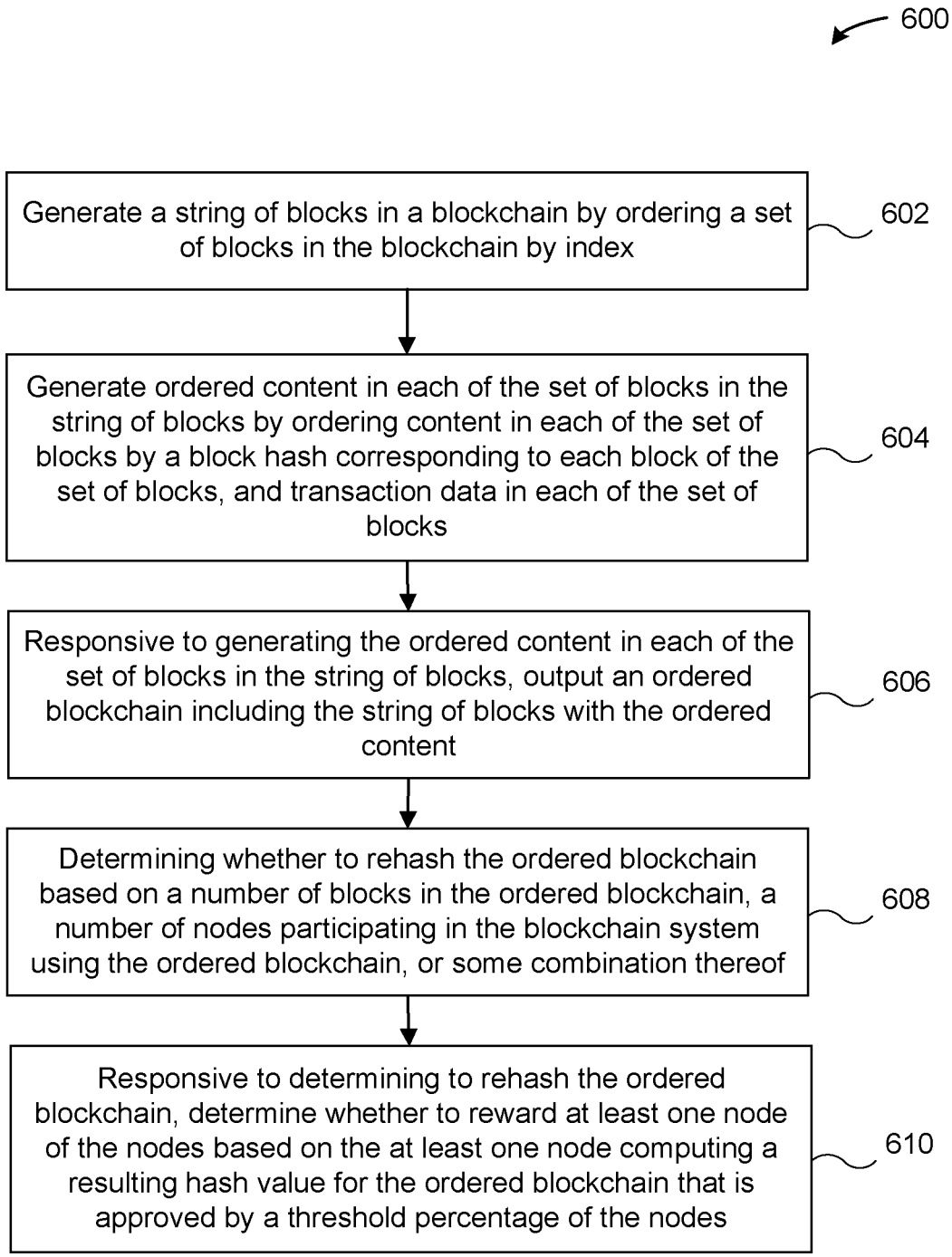
FIG. 6 illustrates example operations of a method for performing block data preparation according to certain embodiments of this disclosure.

FIG. 6 illustrates example operations of a method 600 for performing block data preparation according to certain embodiments of this disclosure. The method 600 includes operations performed by processors of a computing device (e.g., any component or combination of components of the blockchain system 100 of FIG. 1, such as recorder node 102, worker node 104, etc.). In some embodiments, one or more operations of the method 600 are implemented in computer instructions that are stored on a memory device and executed by a processing device. The method 600 may be performed in the same or a similar manner as described above in regards to method 300. The operations of the method 600 may be performed in some combination with any of the operations of any of the methods described herein.

At 602, the processing device may generate a string of blocks in a blockchain 110 by ordering a set of blocks in the blockchain 110 by block index. At 604, the processing device may generate ordered content in each of the set of blocks in the string of blocks by ordering content in each of the set of blocks by a block hash corresponding to each block of the set of blocks, and transaction data in each of the set of blocks. Further, any other corresponding data may be used to order the content after the block hash and the transaction data.

At 606, responsive to generating the ordered content in each of the set of blocks in the string of blocks, the processing device may output an ordered blockchain including the string of blocks with the ordered content.

At 608, the processing device may determine whether to rehash the ordered blockchain based on a number of blocks in the ordered blockchain, a number of nodes participating in the blockchain system 110 using the ordered blockchain, or some combination thereof. At 610, responsive to determining to rehash the ordered blockchain, the processing device may determine whether to reward at least one node (e.g., a recorder node 102) of the nodes based on the at least one node computing a resulting hash value for the ordered blockchain that is approved by a threshold percentage of the nodes (e.g., 51%).

Figure 7:
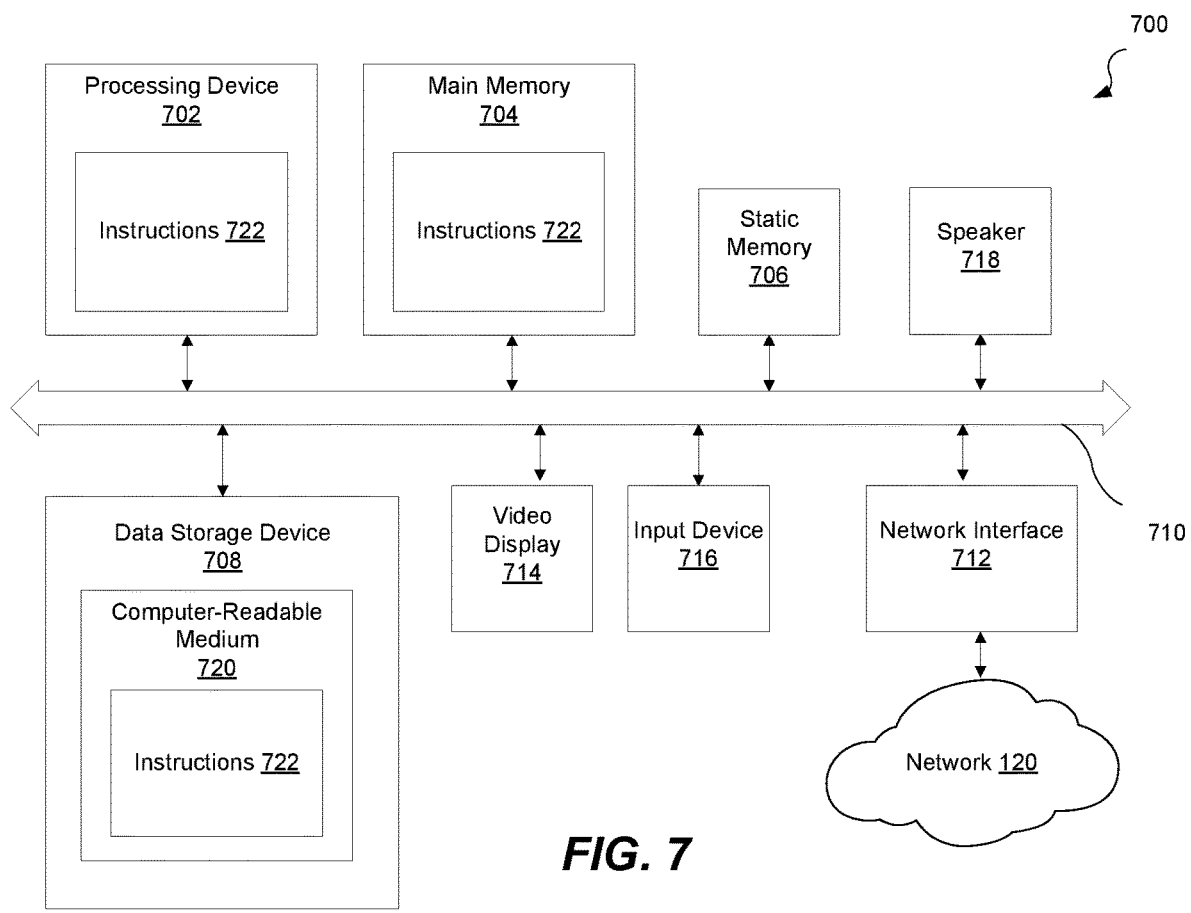
FIG. 7 illustrates an example computer system according to certain embodiments of this disclosure.

FIG. 7 illustrates example computer system 700 which can perform any one or more of the methods described herein, in accordance with one or more aspects of the present disclosure. In one example, computer system 700 may correspond to the recorder nodes 102, worker nodes 104, or any suitable component of FIG. 1. The computer system 700 may be capable of executing application 120 and connecting to and interacting with the blockchain 110 via the application 120 of FIG. 1. The computer system 700 may be connected (e.g., networked) to other computer systems (e.g., other node) in the blockchain system 100 via a LAN, an intranet, an extranet, or the Internet. The computer system 700 may participate in the blockchain system 100. The computer system may operate in the capacity of a server in a client-server network environment. The computer system may be a personal computer (PC), a tablet computer, a wearable (e.g., wristband), a set-top box (STB), a personal Digital Assistant (PDA), a mobile phone, a camera, a video camera, a sensor, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The computer system 700 includes a processing device 702, a main memory 704 (e.g., read-only memory (ROM), flash memory, solid state drives (SSDs), dynamic random access memory (DRAM) such as synchronous DRAM (SDRAM)), a static memory 706 (e.g., flash memory, solid state drives (SSDs), static random access memory (SRAM)), and a data storage device 708, which communicate with each other via a bus 710.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a system on a chip, a field programmable gate array (FPGA), a digital signal processor (DSP), network processor, or the like. The processing device 702 is configured to execute instructions for performing any of the operations and steps discussed herein.

The computer system 700 may further include a network interface device 712. The computer system 700 also may include a video display 714 (e.g., a liquid crystal display (LCD), a light-emitting diode (LED), an organic light-emitting diode (OLED), a quantum LED, a cathode ray tube (CRT), a shadow mask CRT, an aperture grille CRT, a monochrome CRT), one or more input devices 716 (e.g., a keyboard and/or a mouse), and one or more speakers 718 (e.g., a speaker). In one illustrative example, the video display 714 and the input device(s) 716 may be combined into a single component or device (e.g., an LCD touch screen).

The data storage device 716 may include a computer-readable medium 720 on which the instructions 722 embodying any one or more of the methods, operations, or functions described herein is stored. The instructions 722 may also reside, completely or at least partially, within the main memory 704 and/or within the processing device 702 during execution thereof by the computer system 700. As such, the main memory 704 and the processing device 702 also constitute computer-readable media. The instructions 722 may further be transmitted or received over a network via the network interface device 712.

While the computer-readable storage medium 720 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

Consistent with the above disclosure, the examples of systems and method enumerated in the following clauses are specifically contemplated and are intended as a non-limiting set of examples.

Clause 1. A method for maintaining a blockchain in a blockchain system, the method comprising:
  determining whether a number of blocks included in the blockchain satisfies a threshold block condition, wherein the blocks comprise an initial genesis block and one or more subsequent blocks;
  responsive to determining the number of blocks in the blockchain satisfies the threshold block threshold condition, determining whether a number of nodes participating in the blockchain system satisfies a threshold node condition; and
  responsive to determining the number of nodes participating in the blockchain satisfies the threshold node condition, generating a subsequent genesis block by rehashing the blockchain including the genesis block and the one or more subsequent blocks.

Clause 2. The method of any preceding clause, wherein rehashing the blockchain comprises rehashing the initial genesis block and the one or more subsequent blocks in the blockchain to generate the subsequent genesis block.

Clause 3. The method of any preceding clause, further comprising:
  adding another subsequent block after the subsequent genesis block in the blockchain, wherein the blockchain comprises the subsequent genesis block and the another subsequent block.

Clause 4. The method of any preceding cluase, wherein the nodes comprise a plurality of worker nodes and a plurality of recorder nodes.

Clause 5. The method of any preceding clause, wherein determining whether the number of nodes participating in the blockchain system satisfies the threshold node condition further comprises:
  determining whether a minimum number of the plurality of recorder nodes are participating in the blockchain system and a minimum number of the plurality of worker nodes are participating in the blockchain system; and
  responsive to determining the minimum number of the plurality of recorder nodes are participating in the blockchain system and the minimum number of the plurality of worker nodes are participating in the blockchain system, rehashing the initial genesis block and the one or more blocks included in the blockchain to generate the subsequent genesis block having a resulting hash value and providing a reward to at least one of the plurality of recorder nodes that generates the resulting hash value.

Clause 6. The method of any preceding clause, wherein providing the reward to the at least one of the plurality of recorder nodes that generate the resulting hash value further comprises:
  broadcasting the resulting hash value of the subsequent genesis block to other nodes in the plurality of recorder nodes and the plurality of worker nodes participating in the blockchain system; and
  determining that a threshold consensus criteria pertaining to the resulting hash value is satisfied, wherein the threshold consensus criteria comprises at least a percentage of the plurality of worker nodes and the plurality of recorder nodes approve the resulting hash value.

Clause 7. The method of any preceding clause, further comprising:
  distributing the reward equally among each recorder node of the plurality of recorder nodes that computes the resulting hash value of the subsequent genesis block.

Clause 8. The method of any preceding clause, wherein, responsive to providing the reward to the at least one of the plurality of recorder nodes, receiving, from the at least one of the plurality of recorder nodes, broadcasted data associated with the blockchain used to generate the subsequent genesis block.

Clause 9. The method of any preceding clause, wherein at least one of the plurality of worker nodes encodes the reward into another subsequent block that is added to the blockchain after the subsequent genesis block.

Clause 10. The method of any preceding clause, wherein determining whether the number of nodes participating in the blockchain system satisfies the threshold node condition further comprises:
  determining whether a minimum number of the plurality of recorder nodes are participating in the blockchain system; and
  responsive to determining the minimum number of the plurality of recorder nodes are not participating in the blockchain system, continuing to use the blockchain without rehashing the initial genesis block and the one or more subsequent blocks.

Clause 11. The method of any preceding clause, wherein determining whether the number of nodes participating in the blockchain system satisfies the threshold node condition further comprises:
  determining whether a minimum number of worker nodes are participating in the blockchain system; and
  responsive to determining the minimum number of worker nodes are not participating in the blockchain system, rehashing the initial genesis block and the one or more blocks included in the blockchain to generate the subsequent genesis block without providing a reward to any recorder nodes participating in the blockchain system.

Clause 12. The method of any preceding clause, further comprising using a quality factor calculated based on at least one criteria selected from a group of criteria including:
  a number of times the number of blocks in the blockchain satisfies the threshold block condition,
  a number of times the rehashing is performed, and
  a number of times the rehashing is not performed.

Clause 13. The method of any preceding clause, further comprising adjusting a parameter pertaining to management of the blockchain system based on the quality factor, wherein the parameter comprises:
  a minimum number of a plurality of recorder nodes required to be participating in the blockchain system,
  a minimum number of a plurality of worker nodes required to be participating in the blockchain system, or
  both to create a feedback loop to ensure a threshold number of total nodes are participating in the blockchain system, wherein the total nodes comprises the plurality of worker nodes and the plurality of recorder nodes.

Clause 14. The method of any preceding clause, further comprising:
  receiving a request to add a node to the blockchain system, wherein the request comprises information pertaining to whether the node is a recorder node or a worker node;
  adding the node to the blockchain system based on the information.

Clause 15. The method of any preceding clause, further comprising:
  ordering the blocks in the blockchain, wherein the ordering comprises:

generating a string of blocks by ordering a plurality of blocks in the blockchain by block index;
generating ordered content in each of the plurality of blocks in the string of blocks by ordering content in each of the plurality of blocks by a block hash corresponding to each of the plurality of blocks, and transaction data in each of the plurality of blocks; and
responsive to generating the ordered content in each of the plurality of blocks in the string of blocks, outputting an ordered blockchain including the string of blocks with the ordered content.

Clause 16. The method of any preceding clause, further comprising:
receiving, at a first node of the nodes, a block in the blockchain;
determining whether the block is located at a certain position within the blockchain;
responsive to determining the block is located at the certain position within the blockchain, receiving, for a threshold period of time, indications from other nodes participating in the blockchain system;
obtaining an average number of the other nodes from which the indications are received for the threshold period of time; and
determining, based on the average number of the other nodes, a number of nodes to which the first node is connected, wherein the number of nodes is used to determine whether the number of nodes satisfies the threshold node condition.

Clause 17. The method of any preceding clause, wherein the blocks include police report records, healthcare records, financial records, energy-related records, personal records, or some combination thereof.

Clause 18. A method comprising:
receiving, at a first node, a block in a blockchain;
determining whether the block is located at a certain position within the blockchain;
responsive to determining the block is located at the certain position within the blockchain, receiving, for a threshold period of time, indications from other nodes participating in a blockchain system;
obtaining an average number of the other nodes from which the indications are received for the threshold period of time; and
determining, based on the average number of the other nodes, a number of nodes to which the first node is connected.

Clause 19. The method of any preceding clause, further comprising;
determining whether the number of nodes satisfies a threshold node condition; and
responsive to determining the number of nodes satisfies the threshold node condition, determining whether to rehash the blockchain, to provide a reward to one of the nodes, or both.

Clause 20. The method of any preceding clause, wherein the certain position is a preset number of blocks before a last block in the blockchain.

Clause 21. A method comprising:
generating a string of blocks in a blockchain by ordering a plurality of blocks in the blockchain by block index;
generating ordered content in each of the plurality of blocks in the string of blocks by ordering content in each of the plurality of blocks by a block hash corresponding to each block of the plurality of blocks, and transaction data in each of the plurality of blocks; and
responsive to generating the ordered content in each of the plurality of blocks in the string of blocks, outputting an ordered blockchain including the string of blocks with the ordered content.

Clause 22. The method of any preceding clause, further comprising determining whether to rehash the ordered blockchain based on a number of blocks in the ordered blockchain, a number of nodes participating in the blockchain system using the ordered blockchain, or some combination thereof.

Clause 23. The method of any preceding clause, wherein, responsive to determining to rehash the ordered blockchain, determining whether to reward at least one node of the nodes based on the at least one node computing a resulting hash value for the ordered blockchain that is approved by a threshold percentage of the nodes.

What is claimed is:

1. A method for maintaining a blockchain in a blockchain system, the method comprising:
determining whether a number of blocks included in the blockchain satisfies a threshold block condition, wherein the blocks comprise an initial genesis block and one or more subsequent blocks;
responsive to determining the number of blocks in the blockchain satisfies the threshold block threshold condition, determining whether a number of nodes participating in the blockchain system satisfies a threshold node condition; and
responsive to determining the number of nodes participating in the blockchain satisfies the threshold node condition, generating a subsequent genesis block by rehashing the blockchain including the genesis block and the one or more subsequent blocks.

2. The method of claim 1, wherein rehashing the blockchain comprises rehashing the initial genesis block and the one or more subsequent blocks in the blockchain to generate the subsequent genesis block.

3. The method of claim 1, further comprising:
adding another subsequent block after the subsequent genesis block in the blockchain, wherein the blockchain comprises the subsequent genesis block and the another subsequent block.

4. The method of claim 1, wherein the nodes comprise a plurality of worker nodes and a plurality of recorder nodes.

5. The method of claim 4, wherein determining whether the number of nodes participating in the blockchain system satisfies the threshold node condition further comprises:
determining whether a minimum number of the plurality of recorder nodes are participating in the blockchain system and a minimum number of the plurality of worker nodes are participating in the blockchain system; and
responsive to determining the minimum number of the plurality of recorder nodes are participating in the blockchain system and the minimum number of the plurality of worker nodes are participating in the blockchain system, rehashing the initial genesis block and the one or more blocks included in the blockchain to generate the subsequent genesis block having a resulting hash value and providing a reward to at least one of the plurality of recorder nodes that generates the resulting hash value.

6. The method of claim 5, wherein providing the reward to the at least one of the plurality of recorder nodes that generate the resulting hash value further comprises:
broadcasting the resulting hash value of the subsequent genesis block to other nodes in the plurality of recorder nodes and the plurality of worker nodes participating in the blockchain system; and determining that a threshold consensus criteria pertaining to the resulting hash value is satisfied, wherein the threshold consensus criteria comprises at least a percentage of the plurality of worker nodes and the plurality of recorder nodes approve the resulting hash value.

7. The method of claim 5, further comprising:
distributing the reward equally among each recorder node of the plurality of recorder nodes that computes the resulting hash value of the subsequent genesis block.

8. The method of claim 5, wherein, responsive to providing the reward to the at least one of the plurality of recorder nodes, receiving, from the at least one of the plurality of recorder nodes, broadcasted data associated with the blockchain used to generate the subsequent genesis block.

9. The method of claim 5, wherein at least one of the plurality of worker nodes encodes the reward into another subsequent block that is added to the blockchain after the subsequent genesis block.

10. The method of claim 1, wherein determining whether the number of nodes participating in the blockchain system satisfies the threshold node condition further comprises:
determining whether a minimum number of the plurality of recorder nodes are participating in the blockchain system; and
responsive to determining the minimum number of the plurality of recorder nodes are not participating in the blockchain system, continuing to use the blockchain without rehashing the initial genesis block and the one or more subsequent blocks.

11. The method of claim 1, wherein determining whether the number of nodes participating in the blockchain system satisfies the threshold node condition further comprises:
determining whether a minimum number of worker nodes are participating in the blockchain system; and
responsive to determining the minimum number of worker nodes are not participating in the blockchain system, rehashing the initial genesis block and the one or more blocks included in the blockchain to generate the subsequent genesis block without providing a reward to any recorder nodes participating in the blockchain system.

12. The method of claim 1, further comprising using a quality factor calculated based on at least one criteria selected from a group of criteria including:
a number of times the number of blocks in the blockchain satisfies the threshold block condition,
a number of times the rehashing is performed, and
a number of times the rehashing is not performed.

13. The method of claim 12, further comprising adjusting a parameter pertaining to management of the blockchain system based on the quality factor, wherein the parameter comprises:
a minimum number of a plurality of recorder nodes required to be participating in the blockchain system,
a minimum number of a plurality of worker nodes required to be participating in the blockchain system, or both to create a feedback loop to ensure a threshold number of total nodes are participating in the blockchain system, wherein the total nodes comprises the plurality of worker nodes and the plurality of recorder nodes.

14. The method of claim 1, further comprising:
receiving a request to add a node to the blockchain system, wherein the request comprises information pertaining to whether the node is a recorder node or a worker node;
adding the node to the blockchain system based on the information.

15. The method of claim 1, further comprising:
ordering the blocks in the blockchain, wherein the ordering comprises:
generating a string of blocks by ordering a plurality of blocks in the blockchain by block index;
generating ordered content in each of the plurality of blocks in the string of blocks by ordering content in each of the plurality of blocks by a block hash corresponding to each of the plurality of blocks, and transaction data in each of the plurality of blocks; and
responsive to generating the ordered content in each of the plurality of blocks in the string of blocks, outputting an ordered blockchain including the string of blocks with the ordered content.

16. The method of claim 1, further comprising:
receiving, at a first node of the nodes, a block in the blockchain;
determining whether the block is located at a certain position within the blockchain;
responsive to determining the block is located at the certain position within the blockchain, receiving, for a threshold period of time, indications from other nodes participating in the blockchain system;
obtaining an average number of the other nodes from which the indications are received for the threshold period of time; and
determining, based on the average number of the other nodes, a number of nodes to which the first node is connected, wherein the number of nodes is used to determine whether the number of nodes satisfies the threshold node condition.

17. The method of claim 1, wherein the blocks include police report records, healthcare records, financial records, energy-related records, personal records, or some combination thereof.

18. A method comprising:
receiving, at a first node, a block in a blockchain;
determining whether the block is located at a certain position within the blockchain;
responsive to determining the block is located at the certain position within the blockchain, receiving, for a threshold period of time, indications from other nodes participating in a blockchain system;
obtaining an average number of the other nodes from which the indications are received for the threshold period of time; and
determining, based on the average number of the other nodes, a number of nodes to which the first node is connected.

19. The method of claim 18, further comprising;
determining whether the number of nodes satisfies a threshold node condition; and
responsive to determining the number of nodes satisfies the threshold node condition, determining whether to rehash the blockchain, to provide a reward to one of the nodes, or both.

20. The method of claim 18, wherein the certain position is a preset number of blocks before a last block in the blockchain.

21. A method comprising:
generating a string of blocks in a blockchain by ordering a plurality of blocks in the blockchain by block index;
generating ordered content in each of the plurality of blocks in the string of blocks by ordering content in each of the plurality of blocks by a block hash corresponding to each block of the plurality of blocks, and transaction data in each of the plurality of blocks; and
responsive to generating the ordered content in each of the plurality of blocks in the string of blocks, outputting an ordered blockchain including the string of blocks with the ordered content.

22. The method of claim 21, further comprising determining whether to rehash the ordered blockchain based on a number of blocks in the ordered blockchain, a number of nodes participating in the blockchain system using the ordered blockchain, or some combination thereof.

23. The method of claim 21, wherein, responsive to determining to rehash the ordered blockchain, determining whether to reward at least one node of the nodes based on the at least one node computing a resulting hash value for the ordered blockchain that is approved by a threshold percentage of the nodes.

\* \* \* \* \*